3,276,894
IRON OXIDE PIGMENTS CONTAINING MANGANESE

Franz Hund, Heinz Koller, and Dieter Räde, Krefeld-Bockum, and Hein Quast and Karl-Werner Ganter, Krefeld, Germany, assignors to Farbenfabriken Bayer Aktiengesellschaft, Leverkusen, Germany, a corporation of Germany
No Drawing. Filed Sept. 25, 1964, Ser. No. 399,395
Claims priority, application Germany, Sept. 27, 1963, F 40,858
10 Claims. (Cl. 106—304)

The present invention relates to a process for the production of iron oxide pigments which contain manganese and are brown to black in color.

It is an object of the present invention to provide a process for the production of manganese containing iron oxide pigments which have a uniform phase of hematite.

It is another object of the present invention to provide a new and highly economic process for the production of manganese containing iron oxide pigments.

It is a further object of the present invention to provide a process for the production of manganese containing iron oxide pigments which have brown to black colors and which are heat resistant up to temperatures of 800° C.

Still further objects will become apparent as the following description proceeds.

It is known that brown iron oxide pigments can be produced by mixing different iron oxides, for instance, yellow iron oxide (goethite), red iron oxide (hematite) and black iron oxide (magnetite). These mixed pigments, however, have the disadvantage that they readily separate into their components when in oily suspension; this phenomenon is known as "floating out." In addition, the color tones are not resistant to temperature. Above 180° C., they tend to become red in color since the goethite splits off water and the magnetite is oxidized.

It is also known to mix iron oxides and manganese oxides, but these likewise have the disadvantage of mixed pigments.

Furthermore, it has been proposed in German patent specification 881,562 to precipitate iron salts in the presence of manganese salts by means of basic agents, possibly while some of the iron (II) is oxidized to iron (III) by blowing in air, brown to black pigments being obtained, depending upon the manganese content. The pigments obtained, however, do not form any homogeneous phase either. In addition, according to the precipitation conditions, the products formed do not have either an optimum particle size or an optimum particle size spectrum for use as pigments.

Iron is oxidized to iron oxides of various compositions, depending upon the reaction conditions, by the action of aromatic nitro compounds, e.g. nitrobenzene, on metallic iron in the presence of aqueous acidic solutions, more specifically dilute iron (II) chloride solutions. Unless special additives are used, a brownish-black iron (II/III) oxide of weak color and unsuitable as a pigment is obtained, and a weakly colored, non-uniform, blueish red iron (III) oxide is formed from this oxide by annealing in air.

The course of the oxidation of the iron can so be influenced by means of specific additives that the iron compounds that are formed are strongly colored pigments. For example, depending upon the reaction conditions, deep black iron oxide compounds, that change by annealing in air into brilliant yellow to blueish red high grade pigments, are obtained by working in the presence of concentrated solutions of salts which can easily be cracked hydrolytically, whereas the addition of salts of trivalent or tetravalent metals, e.g. aluminum, chromium, the rare earths and thorium, in any desired concentration, promotes the formation of yellow to yellowish brown pigments, which change on annealing in air into a bright red, strongly colored iron (III) oxide of hematite structure. The same pigments are also obtained by using aqueous suspensions of sparingly soluble oxides, hydroxides or basic salts of the trivalent or tetravalent metals instead of the salt solutions mentioned above.

According to other known processes, black, yellow, brown or red iron oxide pigments, which change by annealing in air into bright yellow to blueish red iron (III) oxide pigments, are obtained if the reduction of the aromatic nitro compound is effected with iron and aqueous salt solutions in the presence of phosphoric acid, lead compounds, iron oxide or iron hydroxide nuclei leading to yellowish, reddish brown or red iron (III) hydroxides or oxide.

It is true that strongly colored pigments of the required particle size can be produced by this process, but no brown or black pigments which are resistant to temperature are obtained.

A process has now been found in accordance with the present invention for the production of temperature-resistant manganese containing iron oxide pigments with uniform hematite structure by oxidation of iron with aromatic nitro compounds in the presence of iron (II) salt solutions and/or with addition of concentrated solutions of salts which can be cracked hydrolytically or of solutions of salts of trivalent or tetravalent metals or suspensions of difficultly soluble oxides, hydroxides or basic salts of the metals or in the presence of phosphoric acid or lead compounds or of nuclei leading to yellow, reddish brown or red iron hydroxides or iron oxides, which comprises carrying out said oxidation at a pH-value of the suspension between about 3.5 to 6.5 and in the presence of manganese metal or manganese compounds, possibly with the addition of alkali hydroxides or alkaline earth metal hydroxides, and working up the pigment sludge by filtering, washing and calcining to temperatures of between 600 to 800° C.

It was found to be possible in accordance with the present invention to produce by the same process, both temperature resistant inexpensive brown pigments and also temperature resistant, inexpensive black pigments, depending upon the ratio between iron and manganese. It was found that reddish brown to brown pigments are formed if the ratio between iron and manganese is 100:1 to 15:1, advantageously 50:1 to 15:1, whereas temperature resistant black pigments are obtained with a ratio between iron and manganese of 14:1 to 5:1, advantageously 10:1 to 5:1, the over-all therefore being 100:1 to 5:1. The temperature resistant brown to black pigments obtained after the heat treatment or annealing consist, according to X-ray analysis, of a homogeneous phase of hematite structure and are not ferromagnetic.

The production of brown iron oxide pigments can be carried out by introducing an iron (III) hydroxide suspension of $\alpha$-FeOOH, produced separately from iron (II) salt solution, sodium hydroxide solution and air into a reaction vessel consisting of acid resistant steel, which is provided with a stirrer device and a cover with three tubes for a reflux condenser, nitrobenzene supply and addition of iron. The suspension is heated to 90° C. with some of the nitrobenzene, iron and manganese compound. The remainder of the nitrobenzene, the iron and the manganese compound, which is added dropwise either as soluble manganese (II) salt or as solid manganese compound, e.g. pyrolusite or as manganese metal, with the iron, are then added continuously within 4 to 5 hours. Since the hydrolysis of manganese (II) salts, such as $MnCl_2$ or $MnSO_4$, results in the liberation of hydrochloric and sulfuric acid, respectively, it is sometimes necessary to carry out a single or continuous addition of alkalis, e.g. ammonia, in order to buffer the acid that forms, since otherwise the manganese is only partially incorporated into the pigment. When all the nitrobenzene is reduced, which generally takes 7 to 9 hours, the pigment sludge is separated from the formed aniline by steam distillation, washed and dried at 140° C. The dried product is still not brown, but is olive green and contains the oxides or hydroxides of iron and manganese. It is only at temperatures from 600 to 800° C. that the product changes color to a fine brown and then contains the oxides of the $\alpha$-$Fe_2O_3$ and $\alpha$-$Mn_2O_3$, the $\alpha$-$Mn_2O_3$ forming a solid solution with the hematite phase of the $\alpha$-$Fe_2O_3$. The particles of the pigment are acicular and the size of the particles can be controlled by variation of the number of nuclei. The color tone of the pigments depends upon the particle size and the manganese content, in that large particles and high quantities of manganese (up to 7%) produce solid and dark brown tones, while small particles and low manganese quantities produce light brown to reddish brown color tones.

Temperature resistant brown iron oxide pigments with isometric particles can be obtained by adding small quantities of iron and nitrobenzene to the reaction vessel instead of the iron hydroxide suspension, aniline salt solution or iron (II) salt solution and heating to 90° C. The nuclei thus formed guide the pigment formation, if the residual iron is added more quickly than the nitrobenzene, towards $Fe_3O_4$ with cubic particles. In this procedure also, the manganese compound is added together with the iron or added dropwise as a solution. After completing the reduction, the pigment sludge is worked up, as described above. In this instance also, the previously described dependence of the color tone on the particle size and the manganese content is observed. By addition of small quantities of sulfuric acid, it is possible to control the particle size of the resulting pigments when the reaction mixture reaches the temperature of 90° C.

To produce temperature resistant black pigments, it is possible to work according to one or the other of the processes, but the manganese content must be so increased that at least 8% but preferably 10% or more of $Mn_2O_3$ are contained in the final product.

It has been found that, for the production of black pigments, the process using $Fe_3O_4$, which yields isometric particles, produces blacker and fuller color tones than when starting from an iron (III) hydroxide suspension, in which acicular products are obtained. Raising the manganese content to more than 15% does not provide any additional improvement in the blackness of the pigment.

The production of the manganese containing iron (II) oxide pigments may be performed also by employing in the oxidation process iron manganese alloys or mixtures of metallic iron and metallic manganese or mixtures of metallic iron and manganese alloys or mixtures of metallic manganese and iron alloys.

As soluble manganese compounds, it is possible to use such manganese (II) salts, as the chloride, sulfate, nitrate or acetate, while pyrolusite or rhodochrosite can, for example, be used as insoluble compounds.

Sodium, potassium or lithium hydroxide, sodium, potassium, lithium or ammonium carbonate and ammonia can be added as alkalis.

The aromatic nitro compounds to be reduced may, for example, be aromatic mononitro or polynitro compounds or their halogen, amino, alkyl, aryl or sulfo derivatives.

Suitable aqueous non-oxidizing mineral acids are, for example, sulfuric acid, formic acid, acetic acid or hydrohalic acids, such as hydrochloric acid.

Salts capable of being cracked hydrolytically that can be used include the chlorides, sulfates, and acetates of iron, aluminum, chromium, the rare earths and thorium.

Suitable reaction temperatures are from 70 to 100° C., and advantageously from 90 to 95° C.

As compared with the brown iron oxide hitherto produced by mixing yellow iron oxide (goethite), red iron oxide (hematite) and black iron oxide (magnetite), the temperature resistant brown pigments which can be produced cheaply in accordance with the present invention by the method described have a fuller and browner color tone and are up to 35% stronger in color. Because of their homogeneity, they do not show any tendency towards "floating out" in oily suspension and are particularly resistant to change in color on heating up to 800° C. whereas the brown mixed pigments are discolored towards red above 180° C. because of loss of water from the goethite and oxidation of the magnetite.

The main advantage of the black pigments which can also cheaply be produced in accordance with the present invention in the manner described, lies in their temperature resistance. Furthermore, in contrast to $Fe_3O_4$ (magnetite), they are non-magnetic and, when liquid dispersions of them are triturated, they do not have the same tendency to form aggregations like strings of pearls (magnetic dipole alignment). There can further be employed as semi-conductors, thermistors or catalysts.

*Example 1*

400 ml. of an iron (III) hydroxide suspension, 75 ml. of nitrobenzene, 75 g. of cast iron and 45.5 ml. of $MnCl_2$ solution (100 g./l. of manganese) are heated in 30 minutes to 90° C. while stirring. 20 ml. of 18.5% ammonia are added, followed within 2 hours by 335 ml. of nitrobenzene and within 4 hours by 455 g. of cast iron and 227 ml. of $MnCl_2$ solution (100 g./l. of manganese). The reduction of the nitrobenzene is complete after 9 hours at 90° C. The iron oxide pigment sludge is steam distilled, decanted several times, suction filtered and dried. The ratio between the quantities of iron and manganese is 16.5:1. A solid, dark brown pigment is obtained by annealing in air at 600 to 800° C.

*Example 2*

600 ml. of an iron (III) hydroxide suspension, 75 ml. of nitrobenzene, 75 g. of cast iron and 45.5 ml. of $MnSO_4$ solution (100 g./l. of manganese) are heated in 30 minutes to 90° C. 20 ml. of 18.5% ammonia are added, followed by 335 ml. of nitrobenzene in 2 hours and 455 g. of cast iron and 277 ml. of $MnSO_4$ solution (100 g./l. of manganese) in 4 hours. After 9 hours at 90° C., all the nitrobenzene is reduced. The ratio between the quantities of iron and manganese is 16.5:1. The reaction product is steam distilled, decanted several times, filtered with suction and dried. Heat treatment or annealing at 600 to 800° C. in air, lends to a solid medium brown pigment.

*Example 3*

86 ml. of aniline salt solution ($\delta=1.086$), 172 ml. of $FeCl_2$ solution (36%), 20 ml. of nitrobenzene, 40 g. of cast iron, 12 ml. of $H_2SO_4$ (78%) and 1.15 g. of pyrolusite (80% of $MnO_2$) are heated in 30 minutes to 95° C. and stirred for 30 minutes at 95° C. 475 ml. of nitrobenzene are then added within 2 hours, 720 g. of cast iron within 30 minutes and 62.4 g. of pyrolusite within 4 hours. 300 ml. of water at a temperature of 90° C. are added after 3 hours and then again after 4 hours on reaching 95° C. The reduction is complete after 7 hours at 95° C. The ratio between the quantities of iron and manganese is 25:1. The reaction product is steam distilled, decanted several times, filtered with suction and dried. A solid light brown pigment with a reddish tinge is obtained by annealing at 600 to 800° C. in air.

*Example 4*

86 ml. of aniline salt soltion ($\delta=1.086$), 172 ml. of $FeCl_2$ solution (36%), 20 ml. of nitrobenzene, 40 g. of cast iron, 12 ml. of $H_2SO_4$ (78%) and 3 g. of industrial pyrolusite (80% of $MnO_2$) are heated in 30 minutes to 95° C. while stirring and stirred for 30 minutes. Thereafter, while stirring, 475 ml. of nitrobenzene are added within 2 hours, 720 g. of cast iron within 30 minutes and 166.4 g. of industrial pyrolusite (80% of MnO$_2$). Furthermore, 300 ml. of water at a temperature of 90° C. are added 3 hours and then 4 hours after reaching 95° C. The reduction of the nitrobenzene is complete after 7 hours and the ratio between the quantities of iron and manganese is 8.3:1. The reaction product is steam distilled, decanted several times, washed, suction-filtered and dried. A pigment which is black in color is obtained by annealing at 600 to 800° C.

Example 5

86 ml. of aniline salt solution ($\delta$=1.087), 172 ml. of FeCl$_2$ solution (36% FeCl$_2$), 3.93 g. of MnCl$_2$·4H$_2$O, 80 g. of iron, 3.2 g. of manganese, 10 ml. of H$_2$SO$_4$ (78%) and 20 ml. of nitrobenzene are heated for 30 minutes at 95° C. while stirring. 680 g. of iron and 27.2 g. of manganese are then added in 30 minutes and 475 ml. of nitrobenzene are added in portions in 120 minutes. The reaction is completed after 5 hours at a reaction temperature of 95° C.

The reaction product containing aniline is steam distilled, decanted several times, filtered with suction and dried.

A dark reddish brown pigment with light blue tinges is obtained from the dried product by annealing at 600 to 800° C.

Example 6

217 ml. of AlCl$_3$ solution (7.00% Al), 231 ml. of H$_2$O, 75 ml. of nitrobenzene, 75 g. of iron and 6.0 g. of manganese are heated while stirring for 30 minutes at 90° C. 335 ml. of nitrobenzene are then added in portions over 2 hours and 455 g. of iron together with 36.4 g. of manganese are added in portions over 4 hours. The reaction mixture is stirred for another 5 hours at 90° C. and worked up as indicated in Example 5. A medium-brown pigment with some red tinges is obtained by annealing at 600 to 800° C.

Example 7

217 ml. of AlCl$_3$ solution (7.00% Al), 231 ml. of H$_2$O, 75 ml. of nitrobenzene, 75 g. of iron and 4.5 g. of manganese are heated for 30 minutes at 90° C. while stirring and 300 ml. of ammoniacal liquor (10% of NH$_3$) are then added. 335 ml. of nitrobenzene are added in portions over 2 hours, followed by 455 g. of iron together with 27.3 g. of manganese in portions over 4 hours. The reaction mixture is stirred for another 5 hours at 90° C. and worked up as indicated in Example 5. A dark brown pigment is obtained by annealing at 600 to 800° C.

Example 8

400 ml. of FeSO$_4$ solution (20% FeSO$_4$), 4 g. of ZnCl$_2$, 48.1 g. of wrought iron, 1.90 g. of manganese, 3.63 g. of MnSO$_4$·H$_2$O, 222 ml. of NaOH (19%) and 200 ml. of nitrobenzene are heated while stirring 90° C. and 14 ml. of sulfuric acid (78%) are then added. 325 ml. of nitrobenzene are added over 2 hours and 528.9 g. of wrought iron and also 21.2 g. of manganese over 5 hours. The total reduction time at 90° C. is 10 hours. The reaction product is worked up as indicated in Example 5. A dark brown pigment with blueish tinges is obtained by annealing at 600° C.

We claim:
1. Process for the production of heat resistant manganese containing iron oxide pigments with uniform hematite structure which comprises oxidizing iron with an aromatic nitro compound in the presence of iron (II) salt solution at a pH-value of the resulting suspension between about 3.5 to 6.5 and in the presence of a substance selected from the group consisting of manganese metal and manganese compounds, with the ratio between the added quantities of iron and manganese as manganese compounds being 100:1 to 5:1, and working up the pigment sludge by filtering, washing and calcining to temperatures of between 600 to 800° C.

2. Process according to claim 1 for the production of heat resistant brown iron oxide pigments, wherein the ratio between the added quantities of iron and manganese as manganese compounds is 50:1 to 15:1.

3. Process according to claim 1 for the production of heat resistant black iron oxide pigments, wherein the ratio between the added quantities of iron and manganese as manganese compounds is 10:1 to 5:1.

4. Process according to claim 1, wherein said oxidation is performed in the presence of concentrated solutions of salts which can be cracked hydrolytically.

5. Process according to claim 1, wherein said oxidation is performed in the presence of solutions of salts selected from the group consisting of trivalent and tetravalent metals, and suspensions of difficultly soluble oxides, hydroxides and basic salts of the metals.

6. Process according to claim 1, wherein said oxidation is performed in the presence of substances selected from the group consisting of phosphoric acid, lead compounds, and nuclei leading to yellow reddish brown and red iron hydroxides and oxides.

7. Process according to claim 1, wherein said oxidation is performed in the presence of substances selected from the group consisting of alkali hydroxide and alkaline earth metal hydroxide.

8. Heat resistant manganese-containing iron oxide pigment with uniform hematite structure produced by the process which comprises oxidizing iron with an aromatic nitro compound in the presence of iron (II) salt solution at a pH-value of the resulting suspension between about 3.5 to 6.5 and in the presence of a substance selected from the group consisting of manganese metal and manganese compounds, with the ratio between the added quantities of iron and manganese as manganese compounds being 100:1 to 5:1, and working up the pigment sludge by filtering, washing and calcining to temperatures of between 600 to 800° C.

9. Pigment according to claim 8 wherein the ratio between the added quantities of iron and manganese as manganese compounds used is 50:1 to 15:1 and said pigment is heat-resistant brown iron oxide pigment.

10. Pigment according to claim 8 wherein the ratio between the added quantities of iron and manganese as manganese compounds used is 10:1 to 5:1 and said pigment is heat-resistant black iron oxide pigment.

References Cited by the Examiner
UNITED STATES PATENTS

| | | | |
|---|---|---|---|
| 1,998,540 | 4/1935 | Haberland | 106—304 |
| 1,998,541 | 4/1935 | Haberland | 106—304 |
| 2,273,101 | 2/1942 | Haberland | 106—304 |
| 2,574,459 | 11/1951 | Bennetch | 106—304 |
| 2,811,463 | 10/1957 | Bargyan | 106—304 |
| 2,818,348 | 12/1957 | Jackson | 106—304 |

TOBIAS E. LEVOW, *Primary Examiner.*

S. E. MOTT, *Assistant Examiner.*